Oct. 15, 1929.  W. H. KELLY  1,732,165
DIRECTION SIGNAL FOR AUTOMOBILES
Original Filed Feb. 16, 1928   2 Sheets-Sheet 1
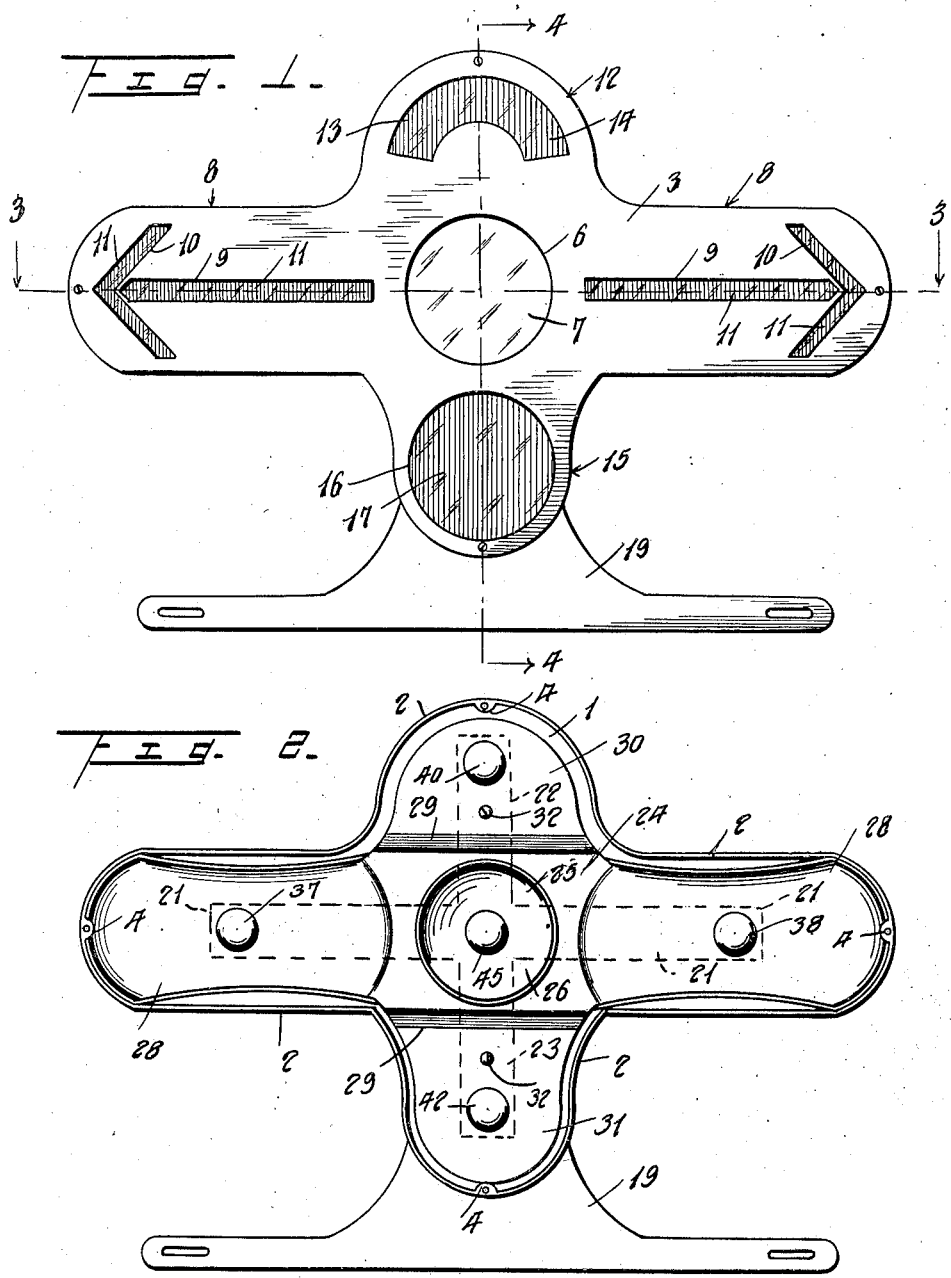

Oct. 15, 1929.  W. H. KELLY  1,732,165
DIRECTION SIGNAL FOR AUTOMOBILES
Original Filed Feb. 16, 1928  2 Sheets-Sheet 2
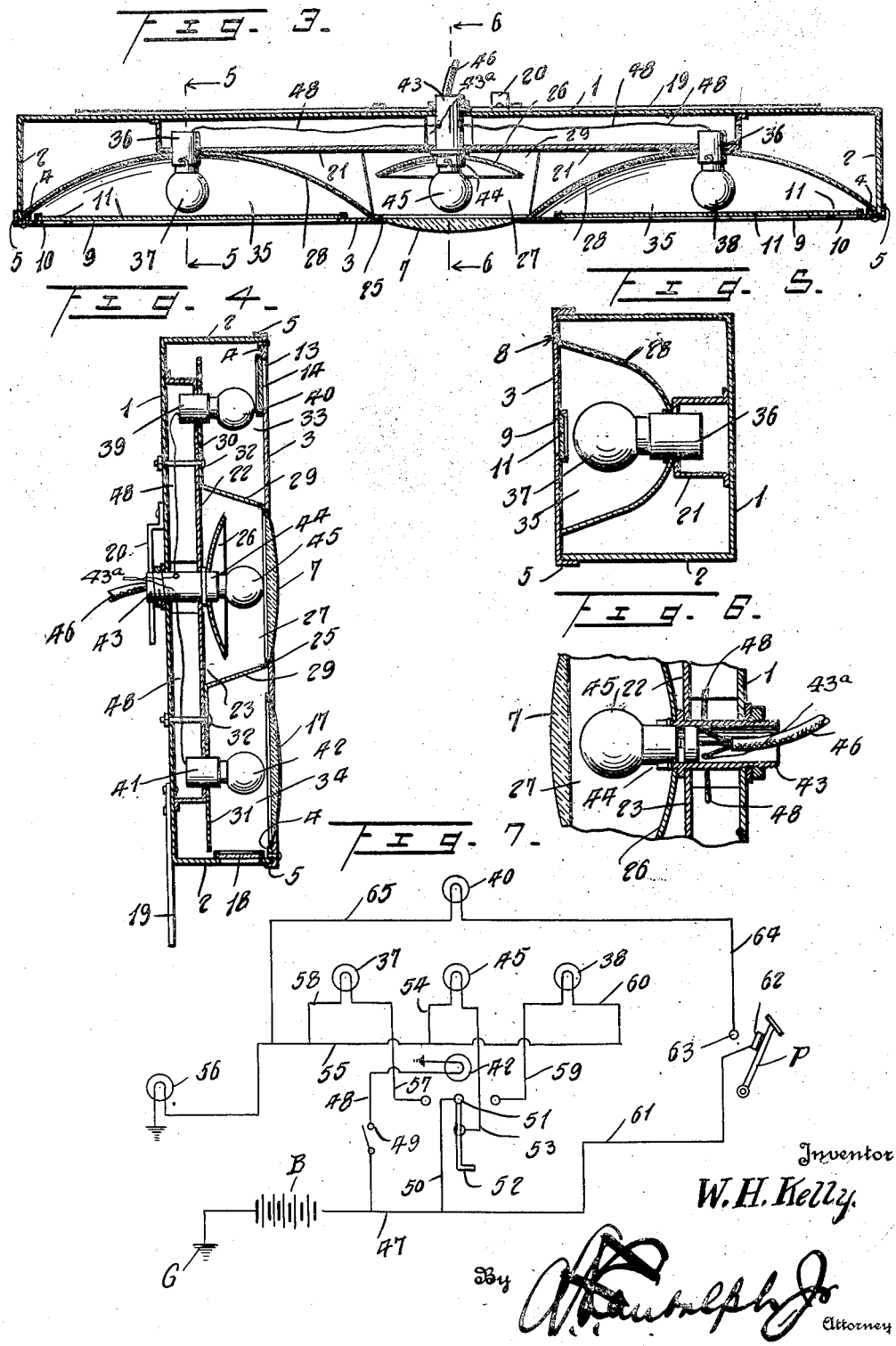

Patented Oct. 15, 1929

1,732,165

UNITED STATES PATENT OFFICE

WILLIAM H. KELLY, OF RENO, NEVADA, ASSIGNOR OF ONE-FOURTH TO J. N. PEDERSEN AND ONE-FOURTH TO A. C. PEDERSEN, BOTH OF RENO, NEVADA

DIRECTION SIGNAL FOR AUTOMOBILES

Application filed February 16, 1928, Serial No. 254,841. Renewed March 14, 1929.

The invention relates to direction signals for automobiles of the type adapted to be used for signaling a change of direction, for signaling intention to reduce speed, and an intention to move in a reverse direction, the signaling device also being provided with a rear light and with means to illuminate the automobile license tag, and has for its principal object the provision of an improved construction of signal including a plate pressed to form walls of the compartment containing the visual signal means, said plate being formed of sheet metal and of reflecting material, and providing means by which automobile signals may be manufactured at a reduced expense because of the utilization of the plate aforesaid to form walls of the signal compartment that are reflectors in character and thus dispense with the necessity of providing separate reflectors for the compartment.

A further object of the invention is the provision in directional signals for automobiles having a plurality of signaling compartments of conduits for the electric wires leading to the several compartments to house the wires interiorly of the signal casing to prevent short circuiting.

The invention will be described in detail hereinafter and will be found illustrated in the accompanying drawings in which Figure 1 is a front view in elevation of a directional signal made in accordance with the invention, Figure 2 is a similar view with the front plate removed to show the plate forming walls of the signaling compartment, Figure 3 is a horizontal sectional view on a plane indicated by the line 3—3 of Figure 1, Figure 4 is a vertical sectional view on a plane indicated by the line 4—4 of Figure 1, Figure 5 is a transverse sectional view on a plane indicated by the line 5—5 of Figure 3, the view being made on an enlarged scale.

Figure 6 is a transverse sectional view on a plane indicated by the line 6—6 of Figure 3, also made on an enlarged scale, and Figure 7 is a diagrammatic view of a circuit for controlling the signal.

In the drawings similar reference characters are used to designate corresponding parts in the several views.

The improved directional signal is preferably formed in a cruciform as shown in Figures 1 and 2, and has a casing provided with a rear wall 1, top, bottom and end walls 2, and a front wall 3 that is secured to the edges of the walls 2 through inwardly extending bosses 4 on the walls 2 and wall 3 is provided with an overlapping flange 5 engaging around the edges of the walls 2. Front wall 3 is provided with signal openings as follows: an opening 6 in the center of the front wall and provided with a clear glass lens 7, said signal opening being utilized by the instrumentalities hereinafter described to indicate that the vehicle is about to move in a reverse direction and to light the path of movement of the vehicle for the accommodation of the operator. In the arms of the cruciform, designated 8 on each side of the opening 6 are formed slotted openings 9 and 10 in the shape of pointed darts or arrows and said openings are covered by transparent panels that may be colored red or any other suitable color, and designated 11. The arm 12 above the opening 6 is provided with a segmental slot 13 having a transparent panel 14 suitably colored and designed to indicate that the vehicle is to reduce its speed or to stop, and the panel may be provided with the legend "Stop" if so desired. The arm 15 below the signal opening 6 is provided with a circular opening 16 having a transparent panel 17 preferably colored red, and utilized as the tail light for the vehicle, and the wall 2 at the lower side of the arm 15 is provided with a transparent panel 18 to illuminate the license tag secured to the bracket 19 carried by the rear wall 1. 20 indicates a bracket secured to the rear wall 1 to secure the casing in position on the vehicle.

Secured to the inner side of the rear wall 1 is a cruciform conduit having arms 21 extending horizontally into the arms 8 of the casing, an arm 22 extending upwardly into the arm 12 of the casing, and an arm 23 extending downwardly into the arm 15 of the casing, said conduit being provided for the wires leading to lamps hereinafter described in the several compartments in the arms of the casing. 24 indicates a plate made of sheet metal and having one of its faces polished to act as a reflector. Said plate 24 has a central opening 25 cut therein, and the metal cut out is utilized for a concaved reflector 26 in the compartment 27 behind the transparent panel 7, the opening 25 in plate 24 being alined with the opening 6 in the front plate 3. The remainder of the plate 24 is pressed into shape as will now be described. Plate 24 is of cruciform and the arms at the sides of the middle portion are pressed to form concaved reflectors 28. Above and below the middle portion of the plate, the plate is bent rearwardly as shown at 29 and has an upwardly extended end 30 and a downwardly extending end 31, said ends 30 and 31 being secured with the cruciform conduit heretofore described to the rear wall by means of bolts or other suitable fastening members 32, said ends 30 and 31 form the rear reflecting walls for the compartments 33 and 34 respectively, behind the transparent plates 14 and 17. The concaved reflectors 28 form the rear walls of the compartments 35 behind the transparent panels 11.

36 indicates lamp sockets secured to the concaved reflectors 28 and the front walls of the arms 21 of the cruciform conduit in which are mounted electric lamps 37 and 38 to illuminate the direction signals for the left and right turn respectively. 39 indicates a socket secured to the upturned end 30 of the plate 24 and the front wall of the arm 22 in which is mounted an electric lamp 40 to illuminate a stop signal. 41 is a socket secured to the downturned end 31 of the plate 24 and the front wall of the arm 23 in which is mounted an electric lamp 42 to illuminate the tail light. Secured to the rear wall 1 and the front wall of the cruciform conduit is a tubular member 43, the front end of the tubular member 43 forming a socket 44 extending through the reflector 26, and 45 is a lamp mounted in socket 44 to illuminate the reverse signal. The tubular member 43 is adapted to receive the conduit cable 46, and is provided with lateral openings 43ª through which the wires hereinafter described are extended to the arms 21, 22 and 23 to the several lamps.

In Figure 7 is shown diagrammatically a circuit that may be used in connection with the signal hereinbefore described in which the battery B has one of its terminals grounded as shown at G and the other terminal provided with a wire 47. 48 indicates a wire connecting the wire 47 with the lamp 42 to ignite the tail light, the circuit to said lamp being grounded as indicated, and also having a switch 49 to control the ignition of the lamp. 50 indicates a wire connected to a point 51 of the switch adapted to control the ignition of the lamps 37, 38 and 45 by means of a switch arm 52, the switch arm in the drawings being shown closing the circuit to a wire 53 leading to the lamp 45, and 54 indicates a return wire that is connected with a wire 55 in circuit with a lamp 56 that is carried conveniently on the instrument board with the switch hereinbefore referred to, said lamp 56 being a tell-tale lamp to indicate when the various signal lamps are in operation, the circuit of the wire 55 to the lamp 56 being grounded as indicated. 57 indicates a wire connected with the lamp 37 and returned by wire 58 to the wire 55, 59 a wire connecting the lamp 38, 60 being a return wire from the lamp 38 and connected to wire 55. 61 is a wire connected with wire 47 and leading to a control pedal of the vehicle designated C and secured to contact member 62, 63 being another contact member for engagement with member 62 to which is connected a wire 64 in circuit with the lamp 40, 65 indicating the return wire from the lamp 40 and connected with the wire 55.

What is claimed is:—

1. In an automobile directional signal, a cruciform casing, a cruciform plate secured in said casing, said plate having an opening therein arranged centrally thereof, opposite arms of said plate pressed into concaved reflectors, the other arms of said plate offset rearwardly, said concaved reflectors and rearwardly offset portions cooperating with the casing to form signaling compartments, the front wall of the casing carrying transparent signaling panels arranged opposite said compartments, and a signal panel arranged opposite the opening in the plate.

2. In an automobile directional signal, a plate made of steel metal and of reflecting material, said plate having a portion removed therefrom forming an opening therein, portions of said plate adjacent to said opening formed into concaved reflectors, other portions of said plate adjacent to said opening offset rearwardly of the plane of said opening forming the rear walls of lamp compartments, a casing enclosing and supporting said plate, and cooperating with said concaved reflectors and rearwardly offset portions to form signaling compartments, said casing including a front wall having transparent signaling panels arranged opposite said signaling compartments, and a signaling panel arranged in alinement with the opening in the plate.

In testimony whereof I affix my signature.

WILLIAM H. KELLY.